June 4, 1929.  L. TADDEO  1,715,797
EQUALIZING DEVICE FOR BRAKES
Filed Nov. 16, 1927   3 Sheets-Sheet 1

INVENTOR:
LUIGI TADDEO
BY George W. Saywell
ATTORNEY.

June 4, 1929.  L. TADDEO  1,715,797
EQUALIZING DEVICE FOR BRAKES
Filed Nov. 16, 1927   3 Sheets-Sheet 2

INVENTOR:
LUIGI TADDEO
BY George W. Saywell
ATTORNEY.

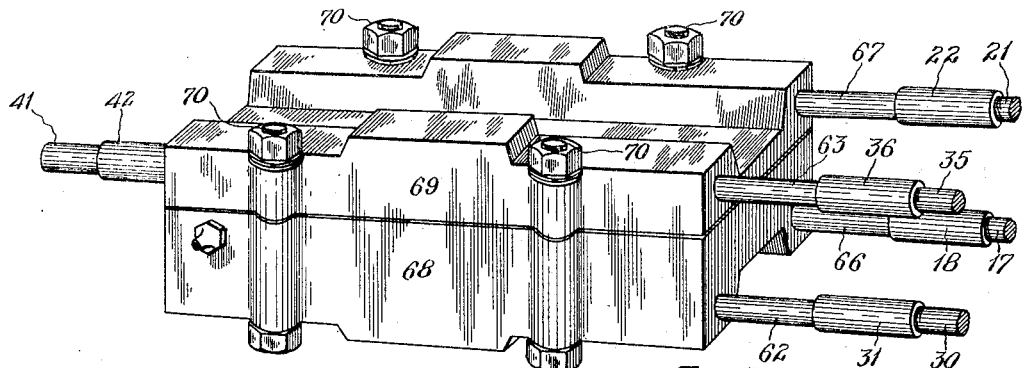
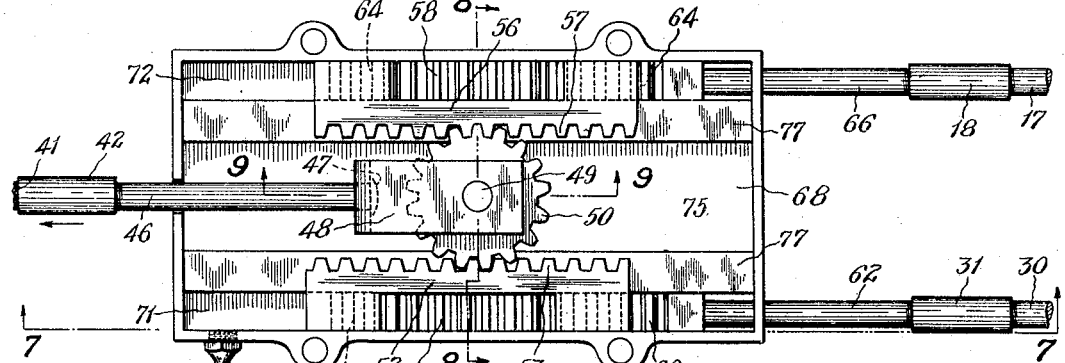
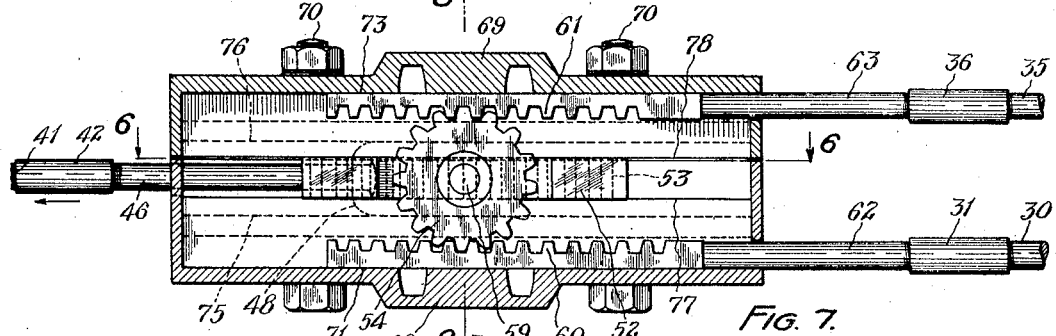
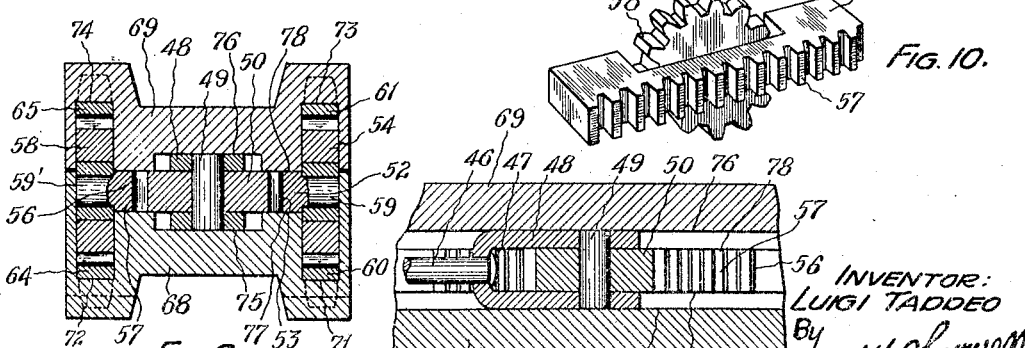

Patented June 4, 1929.

1,715,797

UNITED STATES PATENT OFFICE.

LUIGI TADDEO, OF CLEVELAND, OHIO.

EQUALIZING DEVICE FOR BRAKES.

Application filed November 16, 1927. Serial No. 233,579.

My invention particularly relates to devices of the character noted, adapted to equalize the braking action applied to the four wheels of an automobile. The apparatus includes a floating member comprised of relatively movable parts adapted to compensate for or equalize the differential between the various reactive stresses respectively exerted by the several braking members working upon the four wheels, when said different braking members are worn in different amounts, or for other reasons, react in different degrees to the same braking force.

The annexed drawings and the following description set forth in detail certain means illustrating my invention, such disclosed means constituting, however, but one of the various forms in which the principle of the invention may be embodied.

In said annexed drawings:

Figure 5 is a perspective view, upon an enlarged scale, of the equalizing device proper, the top of the device, as shown in this figure, being one of the sides when it is positioned in the automobile, as seen in Figure 2;

Figure 6 is a side view of the equalizing device with the cover removed, the view being taken from the plane indicated by line 6—6, Figure 7;

Figure 7 is a horizontal, longitudinal section, taken from the plane indicated by the line 7—7, Figure 6;

Figure 8 is a vertical, transverse section, taken in the plane indicated by the line 8—8, Figures 6 and 7;

Figure 9 is a fragmentary, horizontal, longitudinal section, taken in the plane indicated by line 9—9, Figure 6; and Figure 10 is a perspective view of one of a certain pair of similar elements forming part of the equalizing device proper.

Figure 1:
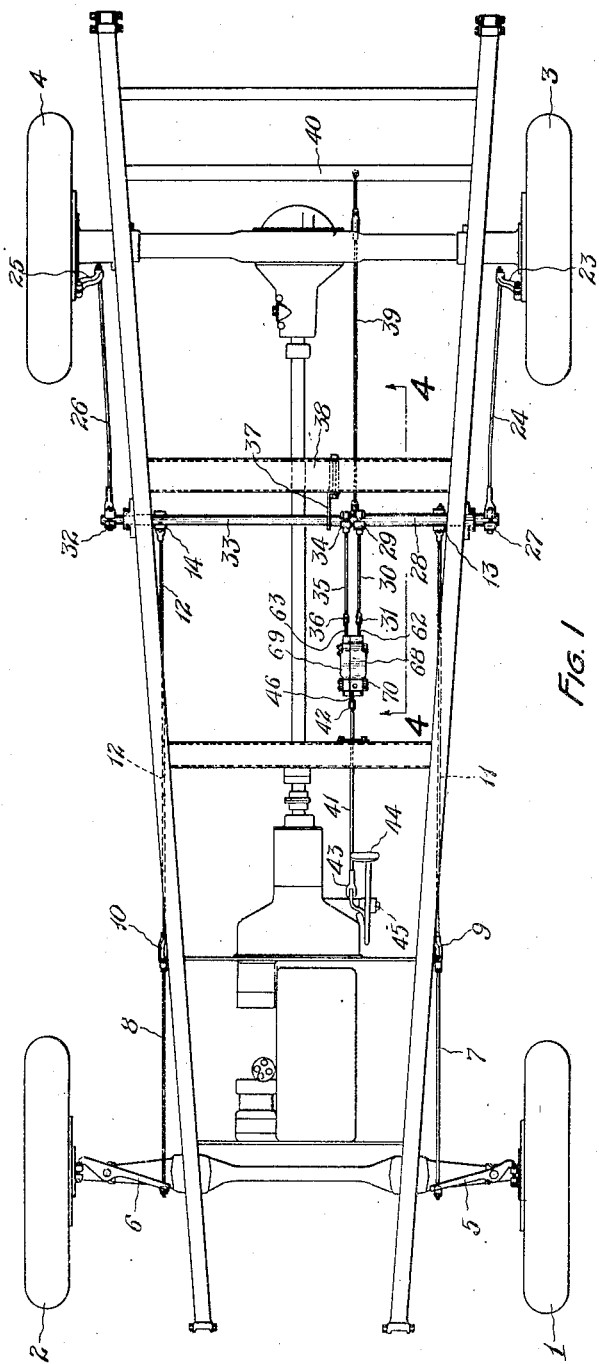
Figure 1 is a plan view of an automobile chassis showing my improved equalizing device acting upon the braking members by which the braking force is applied to the four wheels of the automobile.
Figure 2:
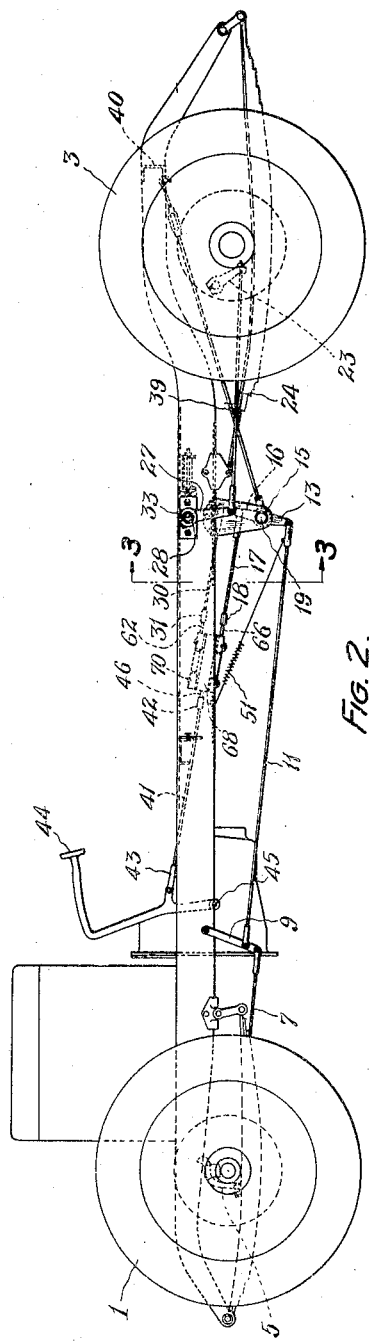
Figure 2 is a side elevation of the elements shown in Figure 1.
Figure 3:
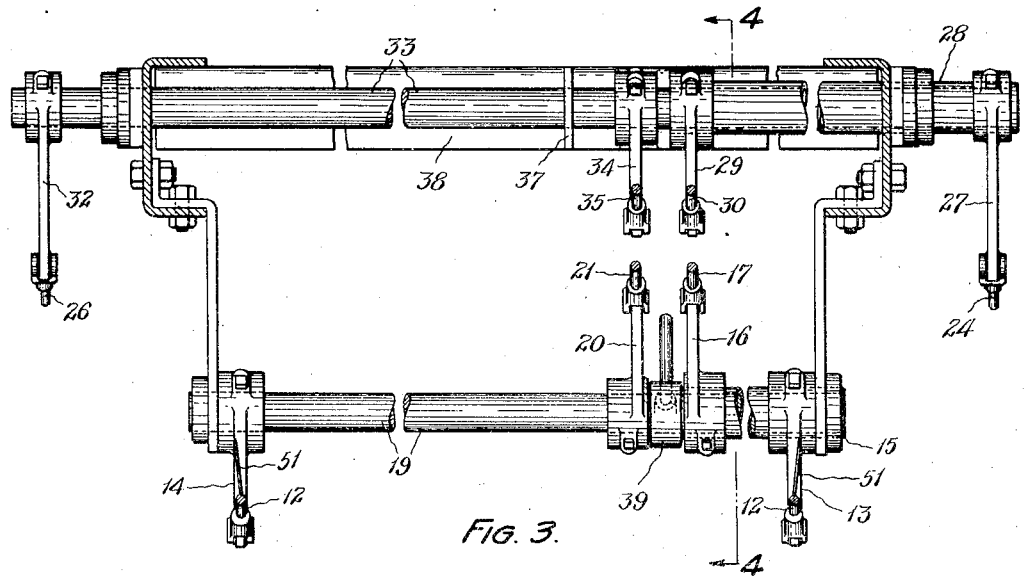
Figure 3 is a broken, transverse, vertical section, taken in the plane indicated by the line 3—3, Figure 2.
Figure 4:
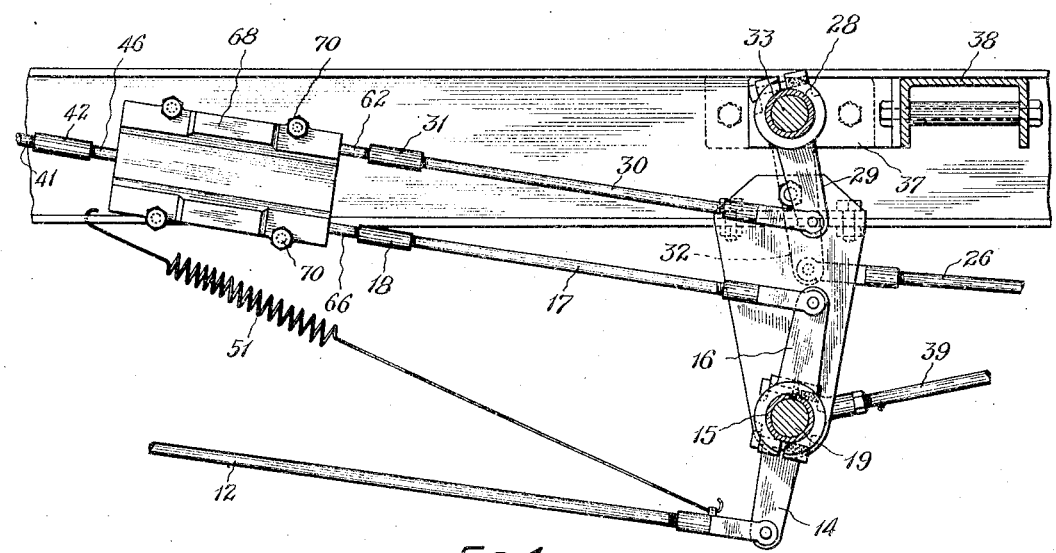
Figure 4 is a fragmentary, longitudinal, vertical section, taken in the plane indicated by the line 4—4, Figures 1 and 3.

Referring to the annexed drawings in which the same parts are indicated by the same respective ordinals in the different views, the four wheels of an automobile are indicated by the respective ordinals 1, 2, 3 and 4, to the front wheels 1 and 2 of which are applied braking devices through the medium of levers 5 and 6 connected, respectively, to rods 7 and 8, whose other ends are pivoted to one end of levers 9 and 10, respectively, whose opposite ends are pivoted upon the chassis frame, there being pivoted to the levers 9 and 10 intermediate their ends a pair of rods 11 and 12 whose other ends are pivoted to levers 13 and 14 respectively, of which the former is secured to a sleeve 15 and the latter is secured to a shaft 19 mounted in the chassis frame and contained within the sleeve 15 at one end. Also secured to the sleeve 15 is a lever 16 pivoted at one end to a rod 17 whose outer end is secured within a coupling member 18. Also secured to the shaft 19 is a lever 20 secured at one end to a rod 21 whose outer end is secured within a coupling 22.

Respectively acting upon braking devices applied to the rear wheels 3 and 4 are a pair of levers 23 and 25 pivotally secured respectively to forwardly extending rods 24 and 26 whose forward ends are pivotally secured to a pair of levers 27 and 32 secured respectively to a sleeve 28 and a shaft 33 mounted in the chassis frame and surrounded at one end by the said sleeve 28. Also secured to the sleeve 28 is a lever 29 whose outer end is secured to a rod 30, the forward end of the latter being secured in a coupling 31. Also secured to the shaft 33 is a lever 34 whose outer end is secured to a rod 35 whose outer end, in turn, is secured in a coupling 36.

Braking action is applied through the medium of the service brake pedal 44 pivoted at the point 45 to the chassis frame and pivotally secured to a lever end 43 which, in turn, is secured to a rod 41 whose rear end is secured in a coupling 42. Through the medium of an equalizing device, which will be described later in detail, any braking action started by the actuation of the service brake pedal 44 will be transferred through the equalizing device to the various rods 17, 21, 30 and 35, and by these rods to the various automobile wheel braking members, the reactive stresses of the latter being equalized accordingly as the various braking devices are unevenly worn or differ for other reasons. This action will, of course, subject shafts 19 and 33 to a considerable stress and in order to brace these shafts I have provided the brace 37 secured to the chassis member 38 rearwardly of the shaft 33 and also enclosing said shaft, and the brace member 39 rotatably mounted upon the shaft 19 and also to the rear chassis member 40. Normally the braking devices on the front wheels 1 and 2 are held in non-engaging position through the medium of springs 51; and the braking devices on the rear wheels 3 and 4 are held in released position by the springs ordinarily forming part of said devices.

Also secured in the coupling member 42 is a rod 46 whose other end, through the medium of an enlarged head 47, is secured within a U-shaped coupling member 48, whose side members lie in vertical planes and form supports for a vertically disposed pinion 50 mounted upon a pin 49 seated in the opposite members of the yoke 48. This yoke member 48 is slidably contained within a housing comprised of two members 68 and 69 secured together through the medium of bolts 70 and plainly shown in Figure 5. The side surfaces 76 and 75, respectively, of this housing form slideways or a guide for the reciprocation of the yoke member 48 and the pinion 50 mounted therein. This pinion 50 engages rack members 53 and 57 formed, respectively, upon blocks 52 and 56 whose outer faces are adapted, respectively, to slide upon the upper and lower inside surfaces 77 and 78 of the housing members 68 and 69.

It is evident, therefore, that the actuation of the service brake pedal 44 to move the rod 46 in the direction of the arrows shown in Figures 6 and 7 will cause the pinion 50 to move the blocks 52 and 56 in the same direction equally or will cause the pinion 50 to roll forwardly upon one or the other of the rack portions 53 and 57, if the reactive stress to the forward movement exerted by one block is different from that to the reactive stress exerted by the other block. The reactive stresses exerted by these blocks are governed, respectively, by the condition of the braking devices upon the front and rear of the automobile, i. e., the reactive stresses exerted by the block 56 at the top of Figure 6 are governed by the reactive stresses of the braking devices applied to the front wheels 1 and 2, and the reactive stress exerted by the block 52, at the bottom of Figure 6, is governed by the condition of the braking devices applied to the rear wheels 3 and 4. Each of the last-mentioned stresses is composed of two factors, i. e., the relation between the respective braking devices of the pair of wheels 1 and 2, and the pair of wheels 3 and 4, respectively. Also secured within the several coupling members 31, 18, 36 and 22, are the ends of rods 62, 66, 63 and 67 respectively, which extend into the housing 68 and 69 and are formed at their forward ends upon one side into rack portions 60, 64, 61 and 65, respectively, whose rear faces are adapted to slide along the inner side surfaces 71, 72, 73 and 74, respectively, of the housing members 68 and 69. These racks 60, 64, 61 and 65, respectively, engage the opposite sides of the pair of pinions 54 and 58 mounted in the blocks 52 and 56, these pinions 54 and 58 being mounted on pins 59 and 59′, respectively, the pinion 54 engaging the pair of racks 61 and 60, respectively, and the pinion 58 engaging the pair of racks 65 and 64, respectively. It is evident, then, that any differential between the reactive stresses of the rods 66 and 67 will be compensated for by the travel of the pinion 58 upon the rack members 64 and 65, and that any differential in the reactive stresses of the rods 62 and 63 will be compensated for by the travel of the pinion 54 upon the rack members 60 and 61. As before stated, any differential between the two pairs of respective rods 62—63 and 66—67, will be compensated for by the travel of the pinion 50 upon the rack members 53 and 57. The several braking devices upon the wheels 1, 2, 3 and 4 will be moved to an extent inversely proportional to the amount of the reactive stresses set up by the several braking devices. The differential between the reactive stresses of of the several braking devices will be compensated for by the relative movements of the rack members 60, 61, 64 and 65, and the rack blocks 52 and 56, which, as will be readily understood, will be severally pulled forwardly distances inversely proportionate to the combination of the individual reactive stresses of the wheels 1, 2, 3 and 4, and the combined stresses of the wheels 1 and 2 on the one hand and the wheels 3 and 4 on the other hand.

What I claim is:

An equalizing brake device comprising, means for applying braking action; two pairs of braking members, said members of each pair being independent; and means for equalizing the differential between the reactive stresses of said pairs of members including movable racks secured to said members respectively, a casing within which said racks are disposed and upon the upper and lower inner faces of which they are adapted respectively to slide, a floating cooperating gear member engaging each pair of racks and adapted to ride upon the same in opposite directions, a pair of sliding blocks within which said gear members are mounted, each block being formed with a rack segment, and a gear member cooperating with said rack segments and mounted upon said brake-applying means.

Signed by me this 14th day of November, 1927.

LUIGI TADDEO.